(12) United States Patent
Yuan et al.

(10) Patent No.: US 12,319,780 B2
(45) Date of Patent: Jun. 3, 2025

(54) EPOXY RESIN SYSTEM HAVING PHASE SEPARATION STRUCTURE, PREPARATION METHOD THEREFOR AND APPLICATION THEREOF

(71) Applicant: SOOCHOW UNIVERSITY, Suzhou (CN)

(72) Inventors: Li Yuan, Suzhou (CN); Aijuan Gu, Suzhou (CN); Guozheng Liang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 525 days.

(21) Appl. No.: 17/785,451

(22) PCT Filed: Dec. 15, 2019

(86) PCT No.: PCT/CN2019/125459
§ 371 (c)(1),
(2) Date: Jun. 15, 2022

(87) PCT Pub. No.: WO2021/119874
PCT Pub. Date: Jun. 24, 2021

(65) Prior Publication Data
US 2023/0024059 A1     Jan. 26, 2023

(51) Int. Cl.
*C08G 59/24*     (2006.01)
*C08G 59/42*     (2006.01)
(Continued)

(52) U.S. Cl.
CPC ......... *C08G 59/245* (2013.01); *C08G 59/42* (2013.01); *C08G 59/50* (2013.01); *C08K 5/07* (2013.01);
(Continued)

(58) Field of Classification Search
CPC ...... C08G 59/245; C08G 59/42; C08G 59/50; C08G 2280/00; C08K 5/07; C08K 5/1515
(Continued)

(56) References Cited

U.S. PATENT DOCUMENTS

2010/0022710 A1     1/2010 Xie et al.

FOREIGN PATENT DOCUMENTS

| CN | 102558503 A | 7/2012 |
| CN | 104744893 A * | 7/2015 |

(Continued)

OTHER PUBLICATIONS

Li et al., CN 104893250 A machine translation in English, Sep. 9, 2015. (Year: 2015).*
(Continued)

*Primary Examiner* — David T Karst
(74) *Attorney, Agent, or Firm* — SZDC Law PC

(57) ABSTRACT

The present invention relates to an epoxy resin system having a phase separation structure, a preparation method therefor and an application thereof. After mixing an epoxy resin, an amine curing agent and an epoxy diluent, pre-polymerization is carried out to obtain a prepolymer 1; or, after mixing an epoxy resin and an amine curing agent, pre-polymerization is carried out to obtain a prepolymer 1; after mixing an epoxy resin, an anhydride curing agent and an accelerator, polymerization is carried out to obtain a prepolymer 2; and after the prepolymer 1 and the prepolymer 2 are mixed, curing is carried out to obtain an epoxy resin system having a phase separation structure. The present invention controls the formation of a thermosetting epoxy resin system having a phase separation structure by means of preparing different epoxy resin pre-polymerization systems and using an interface reaction between the different pre-polymerization systems.

4 Claims, 6 Drawing Sheets

(51) Int. Cl.
*C08G 59/50* (2006.01)
*C08K 5/07* (2006.01)
*C08K 5/1515* (2006.01)

(52) U.S. Cl.
CPC ........ *C08K 5/1515* (2013.01); *C08G 2280/00* (2013.01)

(58) Field of Classification Search
USPC ........................................................ 523/427
See application file for complete search history.

(56) References Cited

FOREIGN PATENT DOCUMENTS

| | | | |
|---|---|---|---|
| CN | 104893250 A | | 9/2015 |
| CN | 106497341 A | * | 3/2017 |
| CN | 106589819 A | | 4/2017 |
| CN | 107118313 A | | 9/2017 |
| CN | 109627695 A | | 4/2019 |
| WO | 2016025476 A1 | | 2/2016 |

OTHER PUBLICATIONS

Zhang et al., CN 106497341 A machine translation in English, Mar. 15, 2017. (Year: 2017).*
Yuan et al., CN 106589819 A machine translation in English, Apr. 26, 2017. (Year: 2017).*
Li et al., CN 104744893 A machine translation in English, Jul. 1, 2015 (Year: 2015).*

* cited by examiner

EPOXY RESIN SYSTEM HAVING PHASE SEPARATION STRUCTURE, PREPARATION METHOD THEREFOR AND APPLICATION THEREOF

This application is the National Stage Application of PCT/CN2019/125459, filed on Dec. 15, 2019.

TECHNICAL FIELD

The invention relates to the field of thermosetting polymer structure and performance design, in particular to a method for preparing an epoxy resin system having phase separation structure with excellent mechanical property.

BACKGROUND TECHNIQUE

Shape Memory Polymers (SMPs) are a type of smart materials that can deform and return to their original shape under external stimulus conditions, heat, light, electricity, magnetism, etc., making them useful in medical devices and smart materials. Robots, aviation structural materials, intelligent response devices and other fields show good application prospects.

At present, the research of SMPs mainly focuses on the research and preparation of dual-character memory polymers, but the singularity of temporary shape memory makes them lack the diversity of shape changes, which limits the possibility of achieving more complex shape changes. The triple-shape memory polymer can fix and realize the recovery of two independent temporary shapes during the shape memory cycle, and is capable of more complex shape changes. Its main feature is that there are two different chain segments in the system as the switch of the shape change. The currently reported triple-shape memory polymers are mainly heat-activated shape memory polymers, among which are mainly thermoplastic components, and usually use thermoplastic components with different melting points to build shape memory properties, but thermoplastic SMPs generally have a slow shape recovery rate. The thermosetting shape memory polymer has the characteristics of fast shape recovery rate, which can be well adapted to the application environment that requires rapid response. Its shape memory effect can be achieved by controlling its crosslinking density. However, as a triple thermosetting SMP, it is difficult to achieve three shape memory effects by blending different thermosetting resins. The reason is that most of the thermosetting resins have similar molecular weights, and they have excellent compatibility and are easy to form copolymers. It is difficult to realize a phase separation structure. Although the thermosetting/thermosetting resin system with phase separation structure can be obtained by increasing the difference in reaction kinetics of different thermosetting resin mixtures, the process parameters of this method are extremely strict, such as the viscosity of the resin system and the amount of catalyst that need to be strictly controlled, otherwise It is difficult to obtain a phase separation structure. Different thermosetting SMP layers can be used to construct a laminated structure to prepare thermosetting SMP with triple-shape memory properties, but the macrostructure of this material is obviously uneven and the preparation procedure is relatively complicated. Therefore, how to effectively construct a SMP with a uniform structural system in a thermoset/thermoset polymer system is of great research significance.

TECHNICAL PROBLEM

The present invention addresses the complex problems of the existing thermosetting shape memory polymer with fewer deformations, poor mechanical properties, and hard to blend phase separation structure of thermosetting/thermosetting resin systems, and proposes to use interfacial reaction technology to realize thermosetting epoxy/thermosetting epoxy polymers Phase separation, and improve its mechanical properties and shape memory function. The present invention provides a method for preparing a epoxy resin system having phase separation structure.

TECHNICAL SOLUTIONS

In order to achieve the above-mentioned object of the invention, the technical solution adopted by the present invention is: an epoxy resin system having phase separation structure which the method for preparing comprising, thermoset after mixing the prepolymer 1 and prepolymer 2 to obtain epoxy resin system having phase separation structure; wherein the method for preparing prepolymer 1, mixing the epoxy resin, amine curing agent and epoxy diluent to obtain prepolymer 1; or mixing epoxy resin and amine curing agent to obtain prepolymer 1.

The method for preparing prepolymer 2 includes mixing the epoxy resin, acid anhydride curing agent and the promoter to obtain prepolymer 2.

In the present invention, the method for preparing prepolymer 1, the mass ratio of the epoxy resin, amine curing agent and epoxy diluent is 100:(10~40):(0~20), the prepolymerization is at room temperature ~150° C. for 10~50 min; the amount of epoxy resin in prepolymer 1 and the amount of epoxy resin in prepolymer 2 can be the same or different, preferably, the amount of epoxy resin in prepolymer 2 is from 30% to 100% of the amount of epoxy resin in prepolymer 1, and more preferably from 50% to 100%; the curing temperature is from 50° C. to 200° C., for example, the curing process is 50° C./1 h+100° C./1 h+120° C./1 h+180° C./1 h.

In the present invention, the epoxy resin is one or more of bisphenol epoxy resin, bisphenol F epoxy resin, hydrogenated epoxy resin, novolac epoxy resin, silicone epoxy resin; epoxy diluent is monofunctional epoxy reactive diluent; amine curing agent and is one or more of aliphatic polyamine, alicyclic polyamine, polyetheramine and aromatic amine; acid anhydride includes hexahydrophthalic anhydride, tetrahydrophthalic anhydride, phthalic anhydride, glutaric anhydride, adipic anhydride, dodecenyl succinic anhydride or methyl nadic anhydride; promoter is tertiary amine compound or a metal organic compound. Preferably, monofunctional epoxy reactive diluent is propenyl glycidyl ether, butyl glycidyl ether or phenyl glycidyl ether; the aliphatic polyamine includes Ethylenediamine, hexamethylenediamine, diethylenetriamine, triethylenetetramine or diethoxypropylamine; said alicyclic polyamines include menthane diamine, N-amine ethyl piperazine, bis(4-aminocyclohexyl) methane or isophorone diamine; the amine value of polyether amine is from 52 to 500 mgKOH/g; aromatic amines include m-phenylenediamine, diaminodiphenylmethane, diaminodiphenyl sulfone or isophenylene diamine amine; the tertiary amine compound is pyridine, triethylamine, triethanolamine or N-dimethylbenzylamine; the metal organic compound is zinc naphthenate, zinc octoate, manganese octoate, zinc acetylacetonate, dilauric acid dibutyltin, zinc acetate, manganese acetylacetonate, calcium acetate or magnesium acetate.

The epoxy resin system having phase separation structure in the invention, the phase separation structure is the interface layer between two different prepolymers when accelerate the reaction of the anhydride and amine. The interface layer restricts the interdiffusion thereby having phase separation structure; the prepared resin system is composed of two different crosslinked networks epoxy polymers are from high glass transition temperature $T_{g1}$ to low glass transition temperature $T_{g2}$, the formed products have broad glass transition temperature region, and even can exhibit two distinct glass transitions owing to the existence of the separated phases (saw FIG. 12). Therefore, the epoxy polymers may display triple-shape memory behavior. The epoxy resin system having phase separation structure and having excellent mechanical properties. The invention discloses the application of the above-mentioned epoxy resin system having phase separation structure in preparation of shape memory polymer.

The epoxy resin of the present invention is: bisphenol A epoxy resin (E51, E44), bisphenol F epoxy resin (NPEF-164X, NPEF-170, NPEF-175, BFE170), hydrogenated epoxy resin (TT700), phenolic epoxy resin (F-48), silicone epoxy resin (KR-220L) or any combination thereof. The epoxy resins in prepolymer 1 and prepolymer 2 can be the same, or can be different; polyetheramines are polyetheramines with different amine values, such as D230 (amine value is from 440-500 mgKOH/g), D400 (amine value is from 220-273 mgKOH/g), D1000 (amine value is from 52-59 mgKOH/g).

Principle of the preparation method of epoxy resin system with phase separation structure of the present invention:

For epoxy resin systems containing different curing agent systems, when the two prepolymer systems are blended, due to the relative diffusion between the resin systems, the acid anhydride and amine substances will quickly undergo chemical reactions when they meet to form an amide substance interface layer. Therefore, the mutual diffusion of the resin systems is inhibited. When the resin system is cured, the amine-containing curing agent resin system and the acid anhydride curing agent resin system respectively undergo curing reactions successively, and finally a resin system with a phase separation structure is formed.

In the present invention, when the material is heated to above the high glass transition temperature zone, the mobility of the chain segments in the polymer crosslinked networks network is enhanced, and the material can be deformed by applying external force. When the material is lowered to a lower glass transition temperature zone, the movement of the segments in the high-temperature-responsive crosslinked networks network freezes, and the first temporary shape is fixed, while the flexible segments in the low-temperature crosslinked networks network are still in an excited state. It can be deformed again under the action of external force, and the second temporary shape can be fixed by continuing to cool down. During the shape memory recovery process, due to the different thermal responsiveness of the chain segments between the crosslinked networks, it can respond to different temperatures, and the temporary shape can be restored to its shape before deformation in order to achieve triple-shape memory performance.

BENEFICIAL EFFECTS

With the application of the above technical solutions, the present invention has the following advantages compared with the prior art:

1. The invention discloses a method for preparing a thermosetting epoxy resin system with a phase separation structure, and the preparation process is simple; when the epoxy resin system containing different curing agents is mixed, the interface reaction is used to form an interface layer to inhibit the different curing agent epoxy resins diffusion of the system triggers the epoxy resin system to form a phase separation structure, with good process controllability and easy industrial production.

2. The invention discloses a preparation method of an epoxy resin system having phase separation structure, which not only has good triple-shape memory performance, but also has unexpected mechanical properties and thermal stability.

DRAWINGS

EXAMPLES OF THE INVENTION

Figure 1:
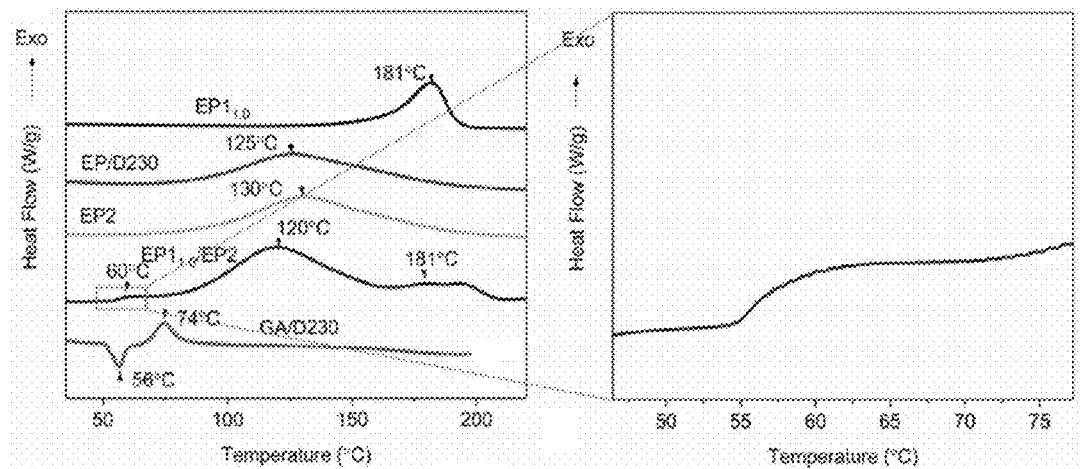
FIG. 1 shows the DSC curves of EP/GA/ZAA, EP/D230, EP/D230/BGE, (EP/D230/BGE)/(EP/GA/ZAA) systems and GA/D230.

The present invention obtains systems with different glass transition temperatures ($T_g$) by changing the crosslinked networks network structure of the resin system. Based on the curing behavior of epoxy resins, an epoxy system with different crosslinked networks network structures is designed to construct a triple-shape memory ring oxygen resin system can form a system of different domain curing regions during the curing process of the resin system, and an epoxy resin system with a phase separation structure can be obtained; on the one hand, this phase separation structure can make the epoxy resin system have a wider The temperature range or two obvious $T_g$s are conducive to the realization of the triple-shape memory effect of the epoxy resin system. On the other hand, the presence of phase separation structural components can effectively improve the mechanical properties of the epoxy resin system.

The epoxy resin system with a phase separation structure disclosed in the present invention has the following preparation method: prepolymer 1 and prepolymer 2 are mixed and then cured to obtain an epoxy resin system with a phase separation structure; the prepolymer 1 The preparation method of the epoxy resin, the amine curing agent and the epoxy diluent is prepolymerized to obtain the prepolymer 1; the preparation method of the prepolymer 2 is to combine the epoxy resin and the acid anhydride curing agent After mixing with the accelerator, prepolymerize to obtain prepolymer 2.

The technical scheme of the present invention will be further described below in conjunction with the drawings and embodiments.

In the present invention:

Test method for glass transition temperature: Dynamic mechanical analysis (DMA) of sample was performed on a TA Instrument DMA Q800 at 1 Hz at a heating rate of 3° C./min. Test frequency is 1 Hz. The glasstransition temperature (Tg) was defined as the peak temperature of Tan Delta curve.

The flexural strength was measured using an electronic universal testing machine (CMT-4104, China) according to GB/T 2567-2008 at a speed of 2 mm/min. Take the average of 10 samples in each group.

The tensile strength test was carried out on the electronic universal testing machine equipped with no-contact optical 3D deformation measuring system (ARAMIS system, GOM, Germany). SEBN was used for tensile strength test. The sample is first used to make a cut with a cutting machine, and a pre-crack is knocked out at the bottom of the cut with a blade, at a speed of 5 mm/min.

Thermal property was analyzed using thermogravimetric analyzer (TGA, TA Discovery TGA Instrument) at a heating rate of 10° C./min under nitrogen flow rate is 50 ml/min. The initial thermal decomposition temperatures at 5% weigh loss.

Example 1

Stirring E51 (50 g), D230 (15 g) and BGE (5 g) at room temperature for 10 minutes, prepolymer 1 could be obtained; Stirring E51 (50 g), GA (15 g) and ZAA (5 g) at 120° C. for 20 min, and then cooled to room temperature to obtain prepolymer 2. The obtained prepolymer 1 and prepolymer 2 were mixed quickly sing mechanical agitation for 5 min and then poured into a glass mold coated with Teflon film, after degassed in vacuum at room temperature, the mixture of prepolymer 1/prepolymer 2 was cured using the temperature procedure of 50° C./1 h+120° C./1 h+160° C./1 h+180° C./1 h.

Control Example 1-1

Stirring E51 (50 g), GA (15 g) and ZAA (5 g) at 120° C. for 20 min, and then poured into a glass mold coated with Teflon film, after degassed in vacuum at room temperature, the mixture of prepolymer 1/prepolymer 2 was cured using the temperature procedure of 50° C./1 h+100° C./1 h+120° C./1 h+180° C./1 h. Take out the cured material after natural cooling.

Control Example 1-2

Stirring E51 (50 g), D230 (15 g) and BGE (5 g) at room temperature for 10 minutes, prepolymer could be obtained, and then poured into a glass mold coated with Teflon film, after degassed in vacuum at room temperature, the mixture of prepolymer 1/prepolymer 2 was cured using the temperature procedure of 50° C./1 h+100° C./1 h+120° C./1 h+180° C./1 h. Take out the cured material after natural cooling.

FIG. 1 is shown the DSC curves of EP/GA/ZAA, EP/D230, EP/D230/BGE, (EP/D230/BGE)/(EP/GA/ZAA) systems and GA/D230. E51/GA/ZAA and E51/D230 respectively display obvious exothermic peaks at 181° C. and 125° C. The reaction temperature of EP/D230 system can be slightly influenced by introducing BGE since it shifts to 130° C. from 125° C.

In this work, BGE can reduce the viscosity of EP/D230 system and take part in the reaction of EP/D230 to adjust the crosslinked networks of EP polymers. Comparing with the DSC curves of E51/GA/ZAA and E51/D230/BGE shows that are quite different of the kinetic reaction temperature. It is very interesting that D230 and the melted GA can quickly react at low temperature (74° C.) except melting peak of GA (56° C.). For comparison, the mixture of (E51/D230/BGE)/(E51/GA/ZAA) obviously exhibits two higher exothermic peaks at about 120 and 181° C., corresponding to the polymerization reactions of E51/D230/BGE and E51/GA/ZAA, respectively. Furthermore, it can be observed that the DSC curve of E51/GA/ZAA displays a new weak exothermic peak at about 60° C., which should be attributed to the reaction of GA and D230 as indicated by the DSC curve of GA/D230. It can be seen that there are three chemical reactions in the (E51/D230/BGE)/(E51/GA/ZAA) system. First of all, when the E51/D230/BGE and E51/GA/ZAA systems are mixed, due to the relative diffusion of the resin system, the chemical reaction between D230 and GA occurs first in the mixed system. As the reaction temperature increases, E51/D230/BGE system began to react, and the reaction temperature was further increased, and the E51/GA/ZAA system also began to react chemically. The DSC curves of the E51/D230/BGE and E51/GA/ZAA mixed systems indicate that the resin systems are not completely compatible due to the formation of the interface layer after the E51/D230/BGE and E51/GA/ZAA systems are mixed.

In order to facilitate the observation of the formation of phase separation structure, the EP/D230/BGE system and the red dye (FV-13) are mixed and dyed at room temperature, and then the (EP/D230/BGE)/(EP/GA/ZAA) system is subjected to an optical microscope. The morphology during mixing and after curing was observed, as shown in FIG. 2.

Figure 2:
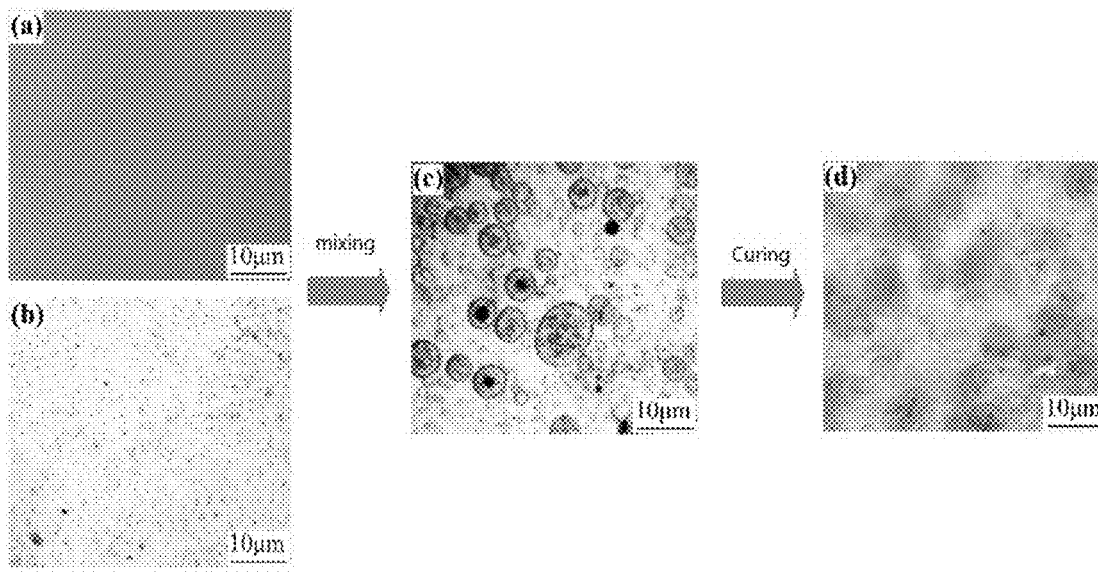
FIG. 2 shows the formation process in E51/GA/ZAA and E51/D230/BGE system monitored by LM, (a) E51/GA/ZAA, (b) dyed E51/D230/BGE system, (c) at normal temperature, mixture of E51/GA/ZAA and E51/D230/BGE system, (d) the cured mixture of E51/GA/ZAA and E51/D230/BGE system.
Figure 3:
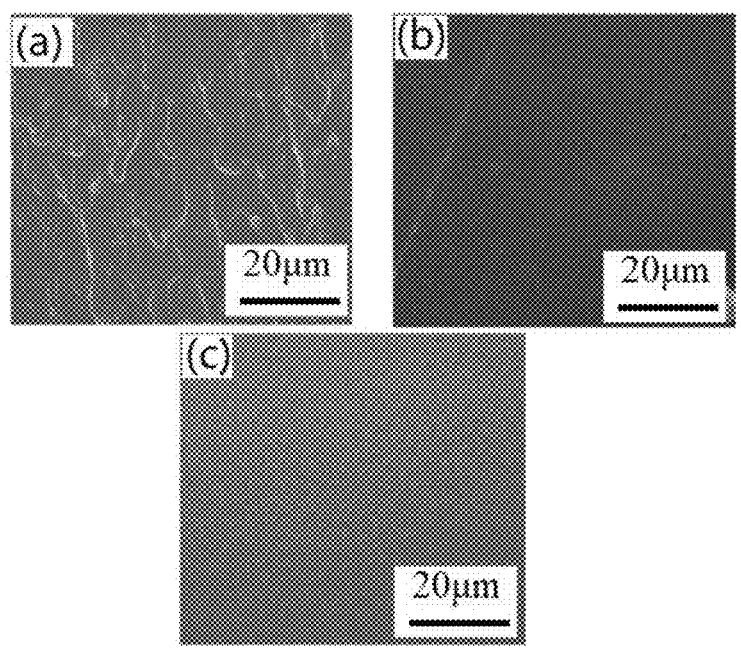
FIG. 3 shows the SEM pictures of cross-sections of samples in Example 1(a) and Control Example 1-1(b) and 1-2(c)

It can be seen from FIG. 2 that when E51/GA/ZAA is mixed with the dyed E51/D230/BGE system, the E51/D230/BGE system is dispersed in the E51/GA/ZAA system in the form of spherical droplets (FIG. 2c), EP/D230/BGE and EP/GA/ZAA systems have an obvious interface layer between them, and it is difficult for relative diffusion to occur. After the mixed system is cured, E51/D230/BGE remains spherically dispersed in the E51/GA/ZAA system, and the cured mixed system is a resin system with a phase separation structure. FIG. 3 is shown the SEM pictures of cross-sections of samples in Example 1(a) and Control Example 1-1(b) and 1-2(c); observed the material section of Control Example 1-1 and Control Example 1-2. It can be found that there is an obvious phase structure in Example 1, and the maximum phase structure size can reach 10 μm.

Table 1 is the performance data of Example 1, Control Example 1-1 and Control Example 1-2. It can be seen from Table 1 that the mechanical properties and thermal properties of Example 1 are not lower than those of Control Example 1-1 and Control Example 1-2. In particular, there is a double Tg phenomenon in Example 1, respectively, which the flexural strength, the fracture toughness was 34%, 18%, and 27%, 17% higher than that of Control Example 1-1 and Control Example 1-2 system.

The reason is: in Example 1, the reaction of GA and D230 reduces the reaction of the flexible component with epoxy resin, which will lead to an increase in the strength of the epoxy resin system, and the presence of the phase structure in the system can significantly block the cracks. The expansion (as shown in FIG. 3a) dissipates more energy and improves the toughness of the material.

TABLE 1

Performance data table of Example 1, Control Example 1-1 and Control Example 1-2

| Example | Tg (° C.) Tg$_1$ | Tg$_2$ | Bending strength (MPa) | fracture toughness (MPa · m$^{1/2}$) | T$_{d1}$ (° C.) |
|---|---|---|---|---|---|
| Example 1 | 94 | 76 | 119 | 1.4 | 370 |
| Control Example 1-1 | 94 | / | 89 | 1.1 | 371 |
| Control Example 1-2 | 63 | / | 101 | 1.2 | 304 |

Figure 4:
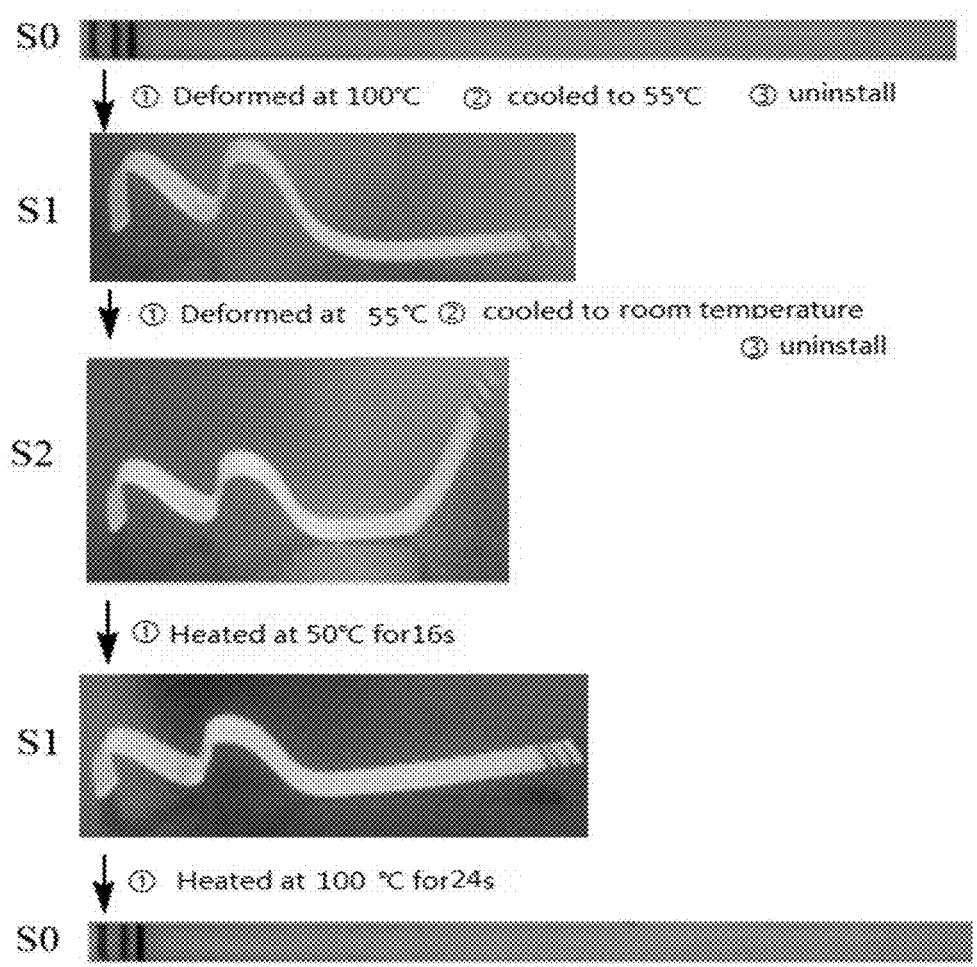
FIG. 4 shows the image demonstration of triple-shape memory processes in Example 1.

FIG. 4 is shown the image demonstration of triple-shape memory processes in Example 1. There are different thermal responses of the different crosslinked networks owing to phase separation structure in Example 1. Fix two shapes respectively to achieve triple-shape memory effect. From FIG. 4, it can be clearly observed that there are typical twice deformed and twice recovered of the polymer system. The original shape S0 was deformed to a temporary shape (S1) at a higher temperature (100° C.), and subsequently, at a lower temperature (55° C.) the sample was stretched to another temporary shape (S2) under load force and unloaded the force after cooling to room temperature, recording. Temporary shape S2 could be recovered to S1 and S0 at 55° C. and 100° C., respectively. There were not triple-shape memory of the resin system obtained in Control Example 1-1 and Control Example 1-2.

It can be seen that the thermosetting resin system in Example 1 showed good triple-shape memory, unexpected mechanical properties and heat resistance effect owing to the phase separation structure.

Example 2

Stirring E51 (50 g) and ethylenediamine (5 g) at room temperature for 10 minutes, prepolymer 1 could be obtained; Stirring E51 (50 g), GA (20 g) and accelerator pyridine (0.055 g) at 110° C. for 10 min, and then cooled to room temperature to obtain prepolymer 2. The obtained prepolymer 1 and prepolymer 2 were mixed quickly sing mechanical agitation for 5 min and then poured into a glass mold coated with Teflon film, after degassed in vacuum at room temperature, the mixture of prepolymer 1/prepolymer 2 was cured using the temperature procedure of 50° C./1 h+120° C./1 h+160° C./1 h+180° C./1 h.

Control Example 2-1

Stirring E51 (50 g), GA (15 g) and accelerator pyridine (0.055 g) at 110° C. for 10 min, and then poured into a glass mold coated with Teflon film, after degassed in vacuum at room temperature, the mixture was cured using the temperature procedure of 50° C./1 h+100° C./1 h+120° C./1 h+180° C./1 h. Take out the cured material after natural cooling.

Control Example 2-2

Stirring E51 (50 g) and ethylenediamine (4 g) at room temperature for 5 minutes, to obtain prepolymer 1. After degassed in vacuum at room temperature, the mixture was cured using the temperature procedure of 50° C./1 h+100° C./1 h+120° C./1 h+180° C./1 h. Take out the cured material after natural c ooling.

Figure 5:
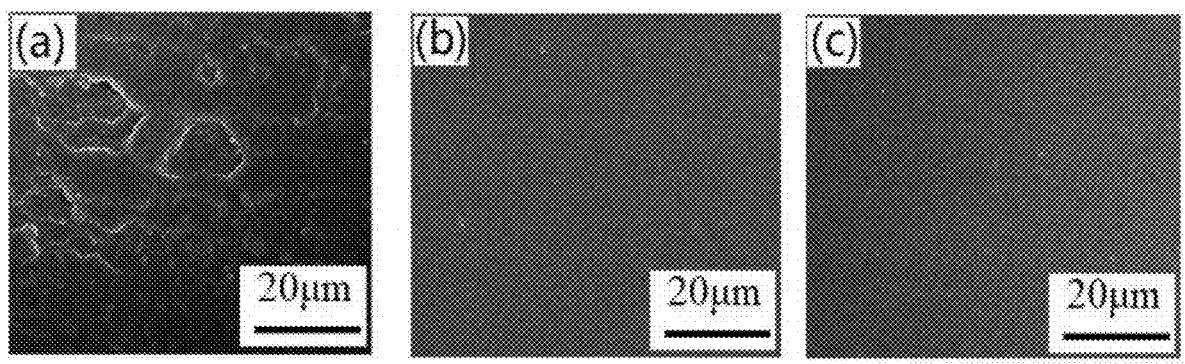
FIG. 5 shows the SEM pictures of cross-sections of samples in Example 2(a) and Control Example 2-1(b) and 2-2(c)

FIG. 5 is shown the SEM pictures of cross-sections of samples in Example 2(a) and Control Example 2-1(b) and 2-2(c). It can be found that there is the obvious phase structure in Example 2.

Table 2 is the performance data of Example 2, Control Example 2-1 and Control Example 2-2. It can be seen from Table 2 that the mechanical properties and thermal properties of Example 2 are not lower than those of Control Example 2-1 and Control Example 2-2. In particular, the flexural strength, the fracture toughness of materials having phase separation structure in Example 2, respectively, were 27%, 25%, and 33%, 50% higher than that of Control Example 2-1 and Control Example 2-2 system.

The reason is: in Example 2, the reaction of GA and ethylenediamine reduces the reaction of the flexible component with epoxy resin, which will lead to an increase in the strength of the epoxy resin system, and the presence of the phase structure in the system can significantly block the cracks. The expansion (as shown in FIG. 5a) dissipates more energy and improves the toughness of the material.

TABLE 2

Performance data table of Example 2, Control Example 2-1 and Control Example 2-2

| Example | Tg (° C.) | Bending strength (MPa) | fracture toughness (MPa · m$^{1/2}$) | T$_{d1}$ (° C.) |
|---|---|---|---|---|
| Example 2 | 101 | 121 | 1.2 | 373 |
| Control Example 2-1 | 97 | 95 | 0.9 | 372 |
| Control Example 2-2 | 69 | 97 | 0.8 | 312 |

Figure 6:
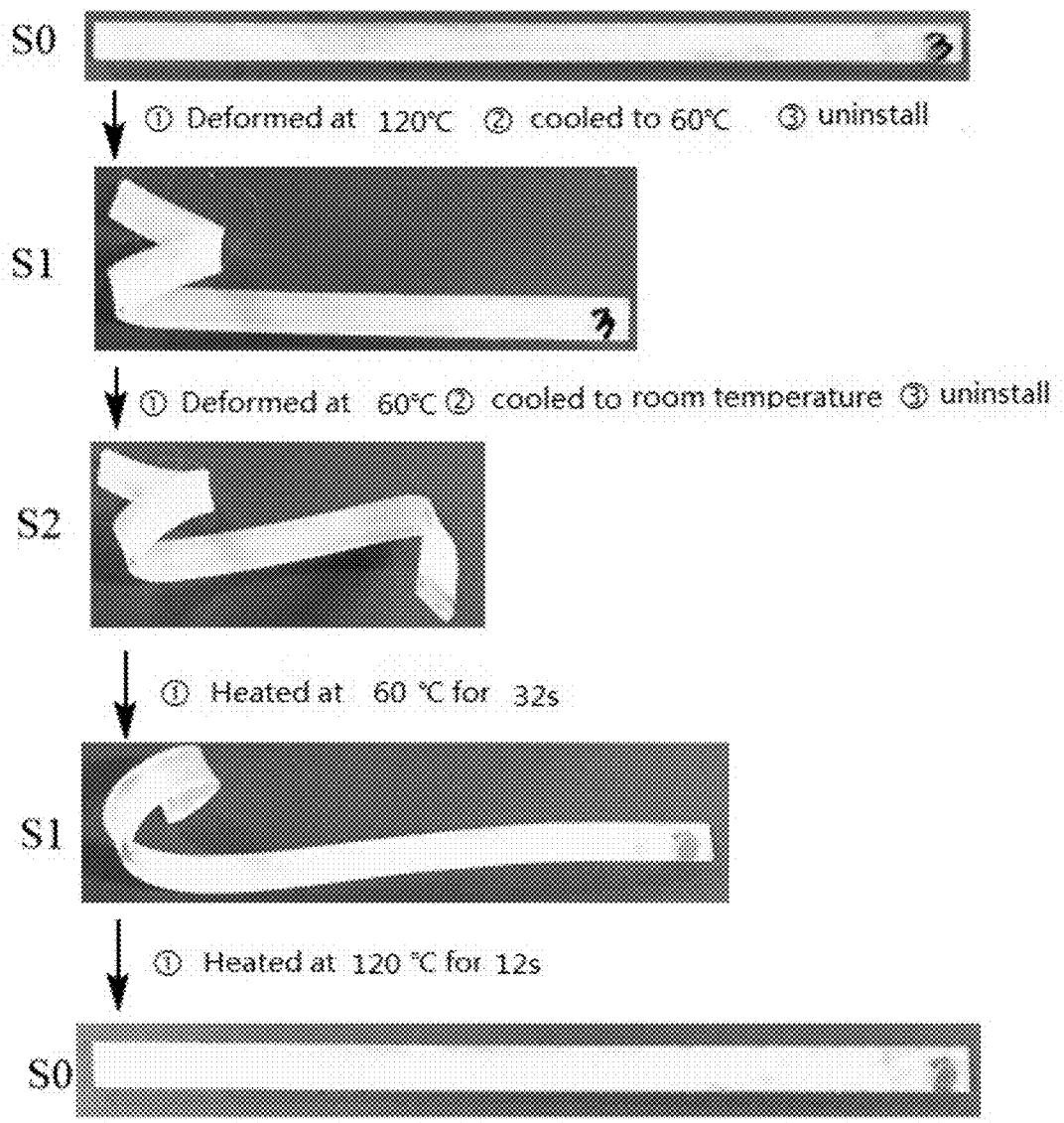
FIG. 6 shows the image demonstration of triple-shape memory processes in Example 2.

FIG. 6 is shown the image demonstration of triple-shape memory processes in Example 2. There are different thermal responses of the different crosslinked networks owing to phase separation structure in Example 2. Fix two shapes respectively to achieve triple-shape memory effect. From FIG. 6, it can be clearly observed that there are typical twice deformed and twice recovered of the polymer system. The original shape S0 was deformed to a temporary shape (S1) at a higher temperature (120° C.), and subsequently, at a lower temperature (60° C.) the sample was stretched to another temporary shape (S2) under load force and unloaded the force after cooling to room temperature, recording. Temporary shape S2 could be recovered to S1 and S0 at 60° C. and 120° C., respectively.

It can be seen that the thermosetting resin system in Example 2 showed good triple-shape memory, unexpected mechanical properties and heat resistance effect owing to the phase separation structure.

Example 3

Stirring BFE170 (50 g) and diaminodiphenylmethane (20 g) at 130° C. for 50 minutes, prepolymer 1 could be obtained; Stirring BFE170 (50 g), tetrahydrophthalic anhydride (25 g) and N-dimethylbenzylamine (0.25 g) at 130° C. for 20 min, to obtain prepolymer 2. The obtained prepolymer 1 and prepolymer 2 were mixed quickly sing mechanical agitation at 130° C. for 5 min and then poured into a glass mold coated with Teflon film, after degassed in vacuum at 150° C., the mixture of prepolymer 1/prepolymer 2 was cured using the temperature procedure of 50° C./1 h+180° C./1 h+200° C./2 h. Take out the cured material after natural cooling.

Control Example 3-1

Stirring BFE170 (50 g), tetrahydrophthalic anhydride (25 g) and N-dimethylbenzylamine (0.2 g) at 130° C. for 20 min, and then poured into a glass mold coated with Teflon film, after degassed in vacuum at 150° C., the mixture was cured using the temperature procedure of 50° C./1 h+180° C./1 h+200° C./2 h. Take out the cured material after natural cooling.

Control Example 3-2

Stirring BFE170 (50 g) and diaminodiphenylmethane (20 g) at 130° C. for 50 minutes, and then poured into a glass mold coated with Teflon film, after degassed in vacuum at 150° C., the mixture was cured using the temperature procedure of 50° C./1 h+180° C./1 h+200° C./2 h. Take out the cured material after natural cooling.

Figure 7:
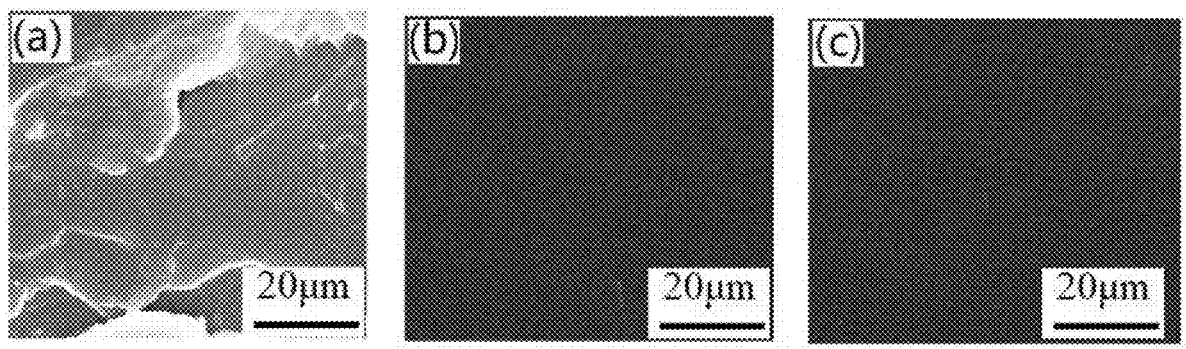
FIG. 7 shows the SEM pictures of cross-sections of samples in Example 3(a) and Control Example 3-1(b) and 3-2(c)

FIG. 7 is shown the SEM pictures of cross-sections of samples in Example 3(a) and Control Example 3-1(b) and 3-2(c). It can be found that there is the obvious phase structure in Example 3.

Table 3 is the performance data of Example 3, Control Example 3-1 and Control Example 3-2. It can be seen from Table 3 that the mechanical properties and thermal properties of Example 3 are not lower than those of Control Example 3-1 and Control Example 3-2. In particular, the fracture toughness of materials having phase separation structure in Example 3, respectively, were 36% and 67% higher than that of Control Example 3-1 and Control Example 3-2 system.

The reason is: in Example 3, the reaction of anhydride and amine reduces the reaction of the flexible component with epoxy resin, which will lead to an increase in the strength of the epoxy resin system, and the presence of the phase structure in the system can significantly block the cracks. The expansion (as shown in FIG. 7a) dissipates more energy and improves the toughness of the material.

TABLE 3

Performance data table of Example 3, Control Example 3-1 and Control Example 3-2

| Example | Tg (° C.) | Bending strength (MPa) | fracture toughness (MPa · m$^{1/2}$) | T$_{d1}$ (° C.) |
|---|---|---|---|---|
| Example 3 | 155 | 130 | 1.5 | 402 |
| Control Example 3-1 | 106 | 125 | 1.1 | 399 |
| Control Example 3-2 | 145 | 118 | 0.9 | 367 |

Figure 8:
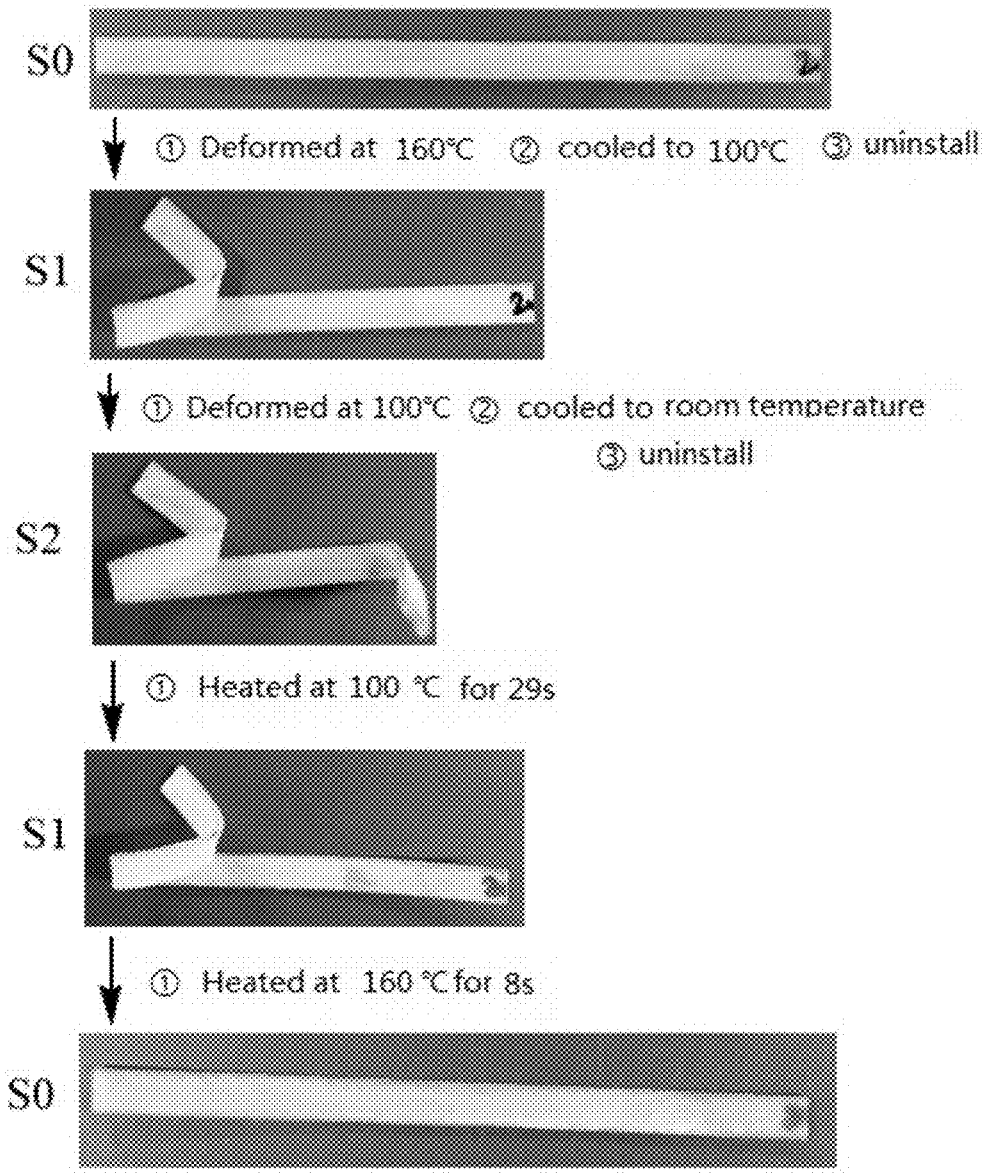
FIG. 8 shows the image demonstration of triple-shape memory processes in Example 3.

FIG. 8 is shown the image demonstration of triple-shape memory processes in Example 3. There are different thermal responses of the different crosslinked networks owing to phase separation structure in Example 3. Fix two shapes respectively to achieve triple-shape memory effect. From FIG. 8, it can be clearly observed that there are typical twice deformed and twice recovered of the polymer system. The original shape S0 was deformed to a temporary shape (S1) at a higher temperature (160° C.), and subsequently, at a lower temperature (100° C.) the sample was stretched to another temporary shape (S2) under load force and unloaded the force after cooling to room temperature, recording. Temporary shape S2 could be recovered to S1 and S0 at 100° C. and 160° C., respectively.

It can be seen that the thermosetting resin system in Example 3 showed good triple-shape memory, unexpected mechanical properties and heat resistance effect owing to the phase separation structure.

Example 4

Stirring E44 (50 g), diaminodiphenylmethane (15 g) and phenyl glycidyl ether (10 g) at 150° C. for 10 minutes, prepolymer 1 could be obtained; Stirring E51 (40 g), methyl nadic acid anhydride (12 g) and accelerator N,N'-dimethylbenzylamine (4 g) at 150° C. for 50 min, to obtain prepolymer 2. The obtained prepolymer 1 and prepolymer 2 were mixed quickly sing mechanical agitation at 150° C. for 5 min and then poured into a glass mold coated with Teflon film, after degassed in vacuum at 150° C., the mixture of prepolymer 1/prepolymer 2 was cured using the temperature procedure of 150° C./1 h+180° C./1 h+200° C./2 h. Take out the cured material after natural cooling.

Control Example 4-1

Stirring E51 (40 g), methyl nadic acid anhydride (12 g) and accelerator N,N'-dimethylbenzylamine (4 g) at 150° C. for 50 min, and then poured into a glass mold coated with Teflon film, after degassed in vacuum at 150° C. was cured using the temperature procedure of 150° C./1 h+180° C./1 h+200° C./2 h. Take out the cured material after natural cooling.

Control Example 4-2

Stirring E44 (50 g), diaminodiphenylmethane (15 g) and phenyl glycidyl etherat (10 g) at 150° C. for 10 minutes, and then poured into a glass mold coated with Teflon film, after degassed in vacuum at 150° C. was cured using the temperature procedure of 150° C./1 h+180° C./1 h+200° C./2 h. Take out the cured material after natural cooling.

Figure 9:
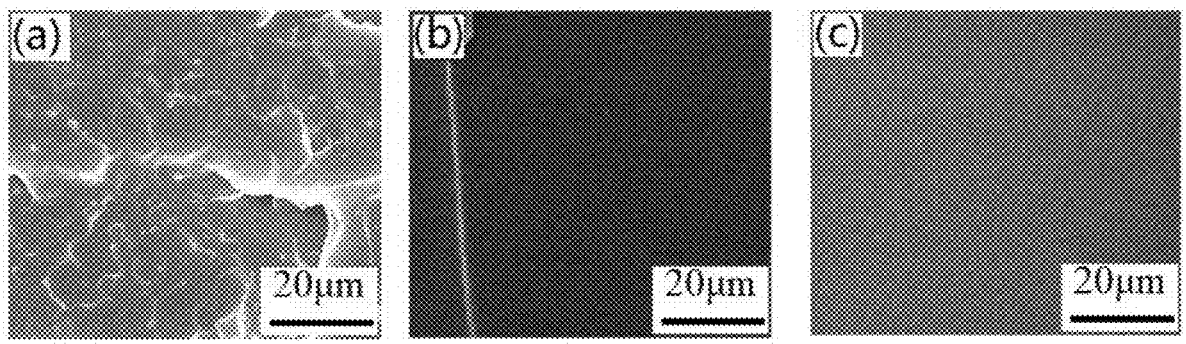
FIG. 9 shows the SEM pictures of cross-sections of samples in Example 4(a) and Control Example 4-1(b) and 4-2(c)
Figure 10:
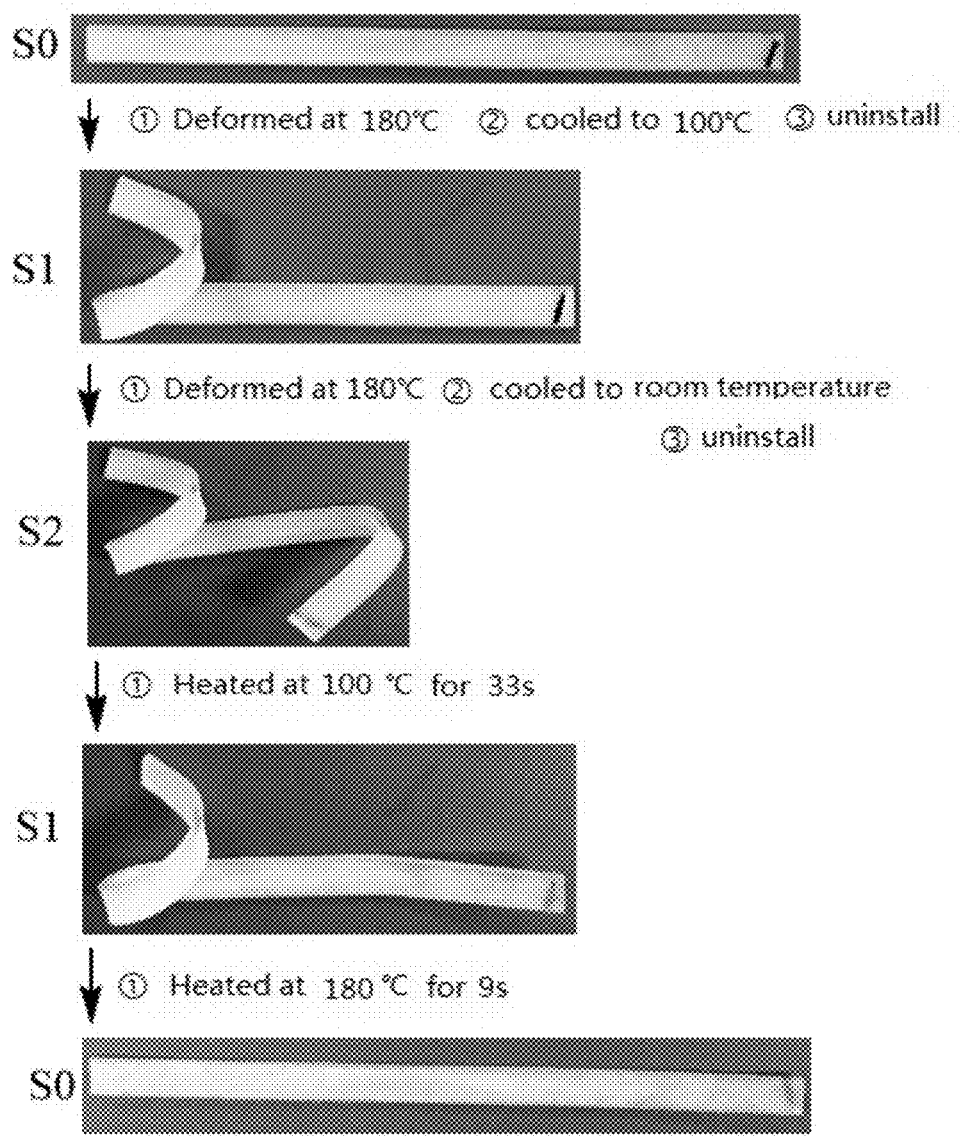
FIG. 10 shows the image demonstration of triple-shape memory processes in Example 4.

FIG. 9 is shown the SEM pictures of cross-sections of samples in Example 4(a) and Control Example 4-1(b) and 4-2(c). It can be found that there is the obvious phase structure in Example 4.

TABLE 4

Performance data table of Example 4, Control Example 4-1 and Control Example 4-2

| Example | Tg (° C.) | Bending strength (MPa) | fracture toughness (MPa · m$^{1/2}$) | T$_{d1}$ (° C.) |
|---|---|---|---|---|
| Example 4 | 160 | 123 |  | 395 |
| Control Example 4-1 | 145 | 117 | 1.3 | 389 |
| Control Example 4-2 | 93 | 89 | 1.0 | 365 |

It can be seen that the thermosetting resin system in Example 4 showed good triple-shape memory, unexpected mechanical properties and heat resistance effect owing to the phase separation structure.

Control Example 5

Figure 11:
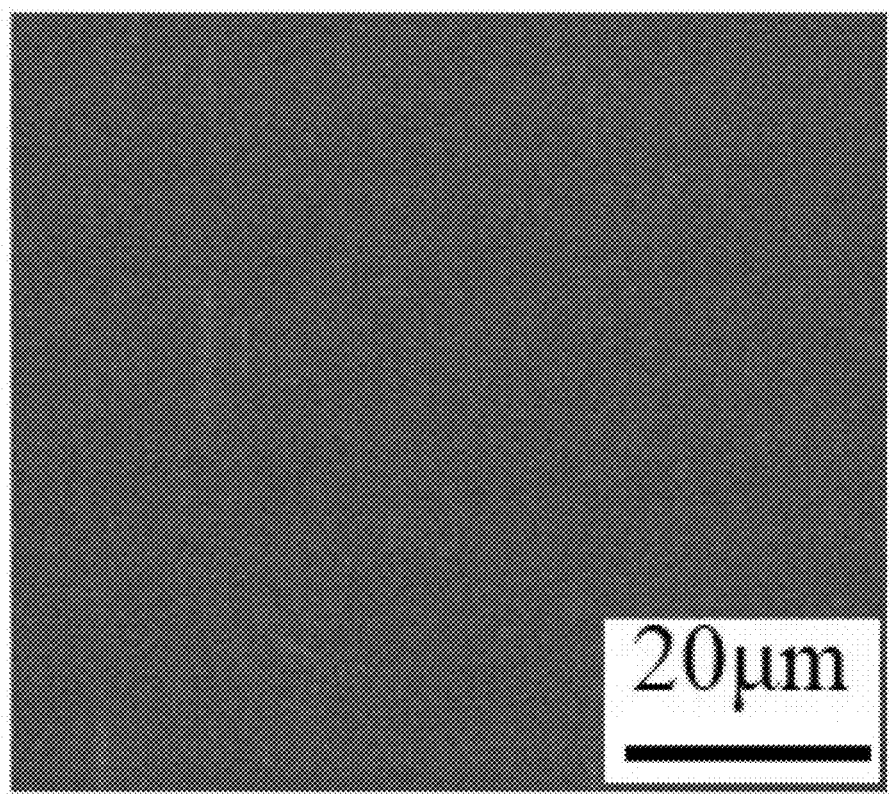
FIG. 11 shows the SEM pictures of cross-sections in Example 5.

Stirring E15 (100 g), D230 (15 g) and diluent of BGE (5 g), GA(15 g) and ZAA(5 g) at room temperature, and then poured into a glass mold coated with Teflon film, after degassed in vacuum at room temperature, the mixture was cured using the temperature procedure of 50° C./1 h+100° C./1 h+120° C./1 h+180° C./1 h. Take out the cured material after natural cooling. It is a homogeneous epoxy resin cured product (having no phase separation structure) (as shown in FIG. 11), and no triple-shape memory properties.

Figure 12:
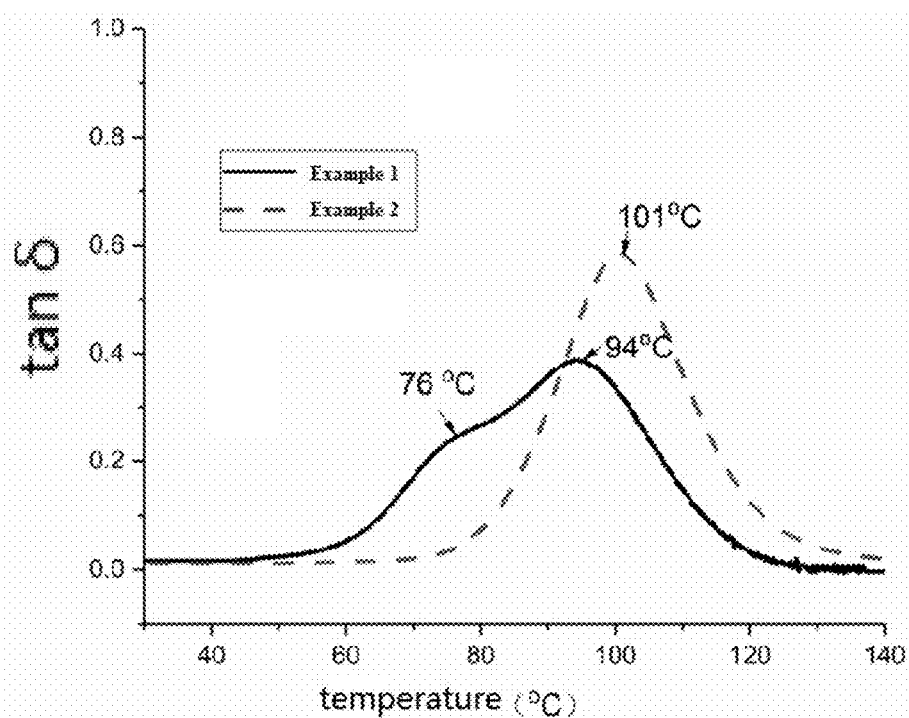
FIG. 12 shows the DMA curves of the cured resin system with a phase separation structure in Example 1 and Example 2.

In summary, the epoxy resin system having phase separation structure in the invention, the phase separation structure is the interface layer between two different prepolymers when accelerate the reaction of the anhydride and amine. The interface layer restricts the interdiffusion thereby having phase separation structure; the prepared resin system is composed of two different crosslinked networks epoxy polymers are from high glass transition temperature $T_{g1}$ to low glass transition temperature $T_{g2}$, the formed products have broad glass transition temperature region, and even can exhibit two distinct glass transitions owing to the existence of the separated phases (saw in FIG. 12). Therefore, the epoxy polymers may display triple-shape memory behavior. The epoxy resin system having phase separation structure and having excellent mechanical properties. The invention discloses the application of the above-mentioned epoxy resin system having phase separation structure in preparation of shape memory polymer. Contrarily, there are no triple-shape memory effects in all of the control examples.

The invention claimed is:

1. A method of preparing an epoxy resin system having phase separation structure comprising,
    mixing an epoxy resin, an amine curing agent, and an epoxy diluent to obtain a prepolymer 1;
    mixing the epoxy resin, an acid anhydride curing agent and a promoter to obtain a prepolymer 2; and
    mixing the prepolymer 1 and the prepolymer 2 and polymerizing to obtain the epoxy resin system having phase separation structure,
    wherein the epoxy resin, the amine curing agent, and the epoxy diluent are mixed in a weight ratio of 100:30:10 at room temperature to 120° C. for 20 minutes to obtain the prepolymer 1.

2. The method of claim 1, wherein the epoxy resin is a bisphenol A epoxy resin, a bisphenol F epoxy resin, a hydrogenated epoxy resin, a novolac epoxy resin, or a silicone epoxy resin; the epoxy diluent is a monofunctional epoxy reactive diluent; the amine curing agent is an aliphatic polyamine, an alicyclic polyamine, a polyetheramine or an aromatic amine; acid anhydride includes hexahydrophthalic anhydride, tetrahydrophthalic anhydride, phthalic anhydride, glutaric anhydride, adipic anhydride, dodecenyl succinic anhydride or methyl nadic anhydride; and the promoter is a tertiary amine compound or a metal organic compound.

3. The method of claim 2, wherein the monofunctional epoxy reactive diluent is acrylic glycidyl ether, butyl glycidyl ether or phenyl glycidyl ether; the aliphatic polyamine is ethylene diamine, hexamethylene diamine, diethylene triamine, triethylene tetramine or diethoxy propylamine; the alicyclic polyamine is menthane diamine, N-aminoethyl piperazine, bis(4-aminocyclohexyl) methane or isophorone diamine; an amine value of the polyetheramine is from 52 to 500 mgKOH/g; the aromatic amine is diaminodiphenylmethane, diaminodiphenyl sulfone or m-phenylenediamine; the tertiary amine compound is pyridine, triethylamine, triethanolamine or N-dimethylbenzylamine; and the metal organic compound is zinc naphthenate, zinc octoate, manganese octoate, zinc acetylacetonate, dibutyltin dilaurate, zinc acetate, manganese acetylacetonate, calcium acetate or magnesium acetate.

4. The method of claim 1, wherein the prepolymer 1 and the prepolymer 2 are polymerized at a curing temperature of 50° C. to 200° C.

* * * * *